United States Patent [19]
Letoffe et al.

[11] Patent Number: 4,824,924
[45] Date of Patent: Apr. 25, 1989

[54] PREPARATION OF TERMINALLY ALKOXYLATED DIORGANOPOLYSILOXANES

[75] Inventors: Michel Letoffe, Sainte Foy Les Lyon; Pierre-Michel Peccoux, Lyons, both of France

[73] Assignee: Rhone-Poulenc Chimie, Courbevoie, France

[21] Appl. No.: 43,362

[22] Filed: Apr. 28, 1987

[30] Foreign Application Priority Data

Apr. 28, 1986 [FR] France ................................ 86 06365

[51] Int. Cl.$^4$ ............................................. C08G 77/06
[52] U.S. Cl. ......................................... 528/21; 528/33; 528/34; 528/901; 525/474
[58] Field of Search ............................ 528/21, 34, 33; 525/474

[56] References Cited

U.S. PATENT DOCUMENTS 3,161,614 12/1964 Brown et al. .......................... 528/33
3,542,901 11/1970 Cooper et al. ......................... 528/33
4,472,551 9/1984 White et al. .......................... 528/28

FOREIGN PATENT DOCUMENTS 2550540 2/1985 France .
1281343 7/1972 United Kingdom .

Primary Examiner—Lewis T. Jacobs
Assistant Examiner—Ralph H. Dean, Jr.
Attorney, Agent, or Firm—Burns, Doane, Swecker & Mathis

[57] ABSTRACT

The diorganopolysiloxane alpha, omega-diol oils are terminally alkoxylated by reacting same with a polyalkoxysilane in the presence of an organic oxime devoid of silicon atoms. The resulting functionalized oils are well adapted for the formulation of single-component, storage-stable organopolysiloxane CVE compositions.

7 Claims, No Drawings

PREPARATION OF TERMINALLY ALKOXYLATED DIORGANOPOLYSILOXANES

BACKGROUND OF THE INVENTION

1. Field of the Invention

The present invention relates to the preparation of diorganopolysiloxanes having alkoxy end groups, referred to hereinafter as PF (polymers containing functional groups), and their particular use as one of the essential constituents of single-component organopolysiloxane elastomeric compositions which are stable in storage in the absence of moisture, but which crosslink on exposure to atmospheric moisture at ambient temperature, hereinafter designated cold vulcanizable elastomeric (CVE) compositions.

2. Description of the Prior Art

A variety of processes are known to this art for the preparation of diorganopolysiloxanes having alkoxy end groups. Compare, for example, the processes described in U.S. Pat. Nos. 3,122,522, 3,161,614 and Re. 29,760. The processes described in these patents are not employed industrially at the present time, because they are either too costly or provide PFs of poor quality for their essential use as a base polymer for CVE compositions.

A major advance in the art is described in U.S. Pat. No. 3,542,901, namely, a process for the preparation of PF by reacting an alpha,omega-dihydroxydiorganopolysiloxane polymer, in other words a diorganopolysiloxane having silanol end groups, with a polyalkoxysilane in the presence of a catalyst for functionalization with an amine group.

This process is undoubtedly efficient, but it is very difficult to effectively remove the amine, which may have a detrimental effect on the storage stability of the CVE composition in the presence of the condensation catalyst, which is a metal, typically tin compound.

Other catalysts may be used, such as, for example, an organic titanium derivative (U.S. Pat. No. 4,111,890), an alkoxyaluminum chelate (British Pat. No. 2,144,758) and a N,N-disubstituted hydroxylamine (French Pat. No. 2,508,467, U.S. Pat. No. 4,472,551). These catalysts may present the disadvantage of poor efficiency or of having a detrimental influence on the storage stability of the CVE compositions.

Another process for producing PFs uses mixed silanes which, in addition to the alkoxy groups, contain a hydrolyzable group, such as an amido, amino, carbamate or oxime group, or the like, optionally in the presence of a known functionalization catalyst and a polyalkoxysilane.

Processes of this type are described particularly in U.S. Pat. Nos. 3,697,568, 3,896,079 and EP-A No. 69,256.

These processes are efficient, but require the use of costly mixed silanes. Furthermore, the organic compounds provided by the hydrolyzable groups after the reaction can have a detrimental effect on the CVE composition (see, on this subject, pages 4 and 5 of French Pat. No. 2,543,562).

SUMMARY OF THE INVENTION

Accordingly, a major object of the present invention is the provision of an improved process for the preparation of terminally alkoxylated diorganopolysiloxanes using a cheap and efficient functionalization catalyst which imparts no detrimental secondary effects to the ultimate CVE compositions, even in the case when it is not separated or removed beforehand from the PFs produced therefrom.

Briefly, the present invention features a process for the preparation of diorganopolysiloxanes having polyalkoxy end groups of the formula:

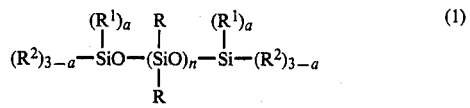

by reacting at least one diorganopolysiloxane of the formula:

with at least one polyalkoxysilane of the formula:

in the presence of a catalytically effective amount of at least one organic compound devoid of silicon and comprising an oxime group, in which formulae the radicals R, which may be identical or different, are each monovalent hydrocarbon radicals containing from 1 to 10 carbon atoms, optionally substituted or otherwise by halogen atoms or cyano groups, $R^1$ is a monovalent $C_1$–$C_{10}$ hydrocarbon radical, $R^2$ is an alkoxy or polyalkoxy radical of the formulae: TO, TOZO, in which T is a $C_1$–$C_4$ alkyl radical, Z is a straight or branched chain $C_2$–$C_4$ alkylene radical, a is 0 or 1, and n is an integer having a value such that the polymers of formulae (1) and (2) have a viscosity of 700 to 1,000,000 mPa.s at 25° C.; n thus is an integer ranging from about 50 to 2,500.

DETAILED DESCRIPTION OF THE PREFERRED EMBODIMENTS OF THE INVENTION

More particularly according to the present invention, the organic catalyst devoid of silicon and comprising an oxime group advantageously has the general formula:

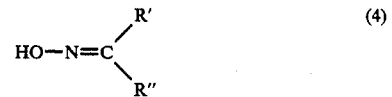

in which R' is a monovalent $C_1$–$C_{15}$ hydrocarbon radical, R" is a hydrogen atom or a monovalent $C_1$–$C_{15}$ hydrocarbon radical, with the proviso that R' and R" may together form, with the carbon atom from which they depend, a divalent carbocyclic alkylene radical containing from 3 to 6 ring carbon atoms.

Exemplary of the monovalent $C_1$–$C_{15}$ hydrocarbon radicals R' and R", representative are alkyl and alkenyl radicals, such as methyl, ethyl, propyl, butyl, pentyl, hexyl, vinyl and butenyl radicals, and exemplary of saturated or unsaturated cyclic hydrocarbon radicals R' and R", preferably containing 5 to 8 ring carbon atoms, are cycloalkyl radicals, such as cyclopentyl, cyclohexyl, cycloheptyl, cyclooctyl, 3-methyl-1-cyclohexyl, cyclopentenyl and cyclohexenyl, phenyl and alkylphenyl radicals, such as tolyl and xylyl, and phenylalkyl radicals, such as the benzyl radical.

Exemplary of carbocyclic radicals formed together by R' and R", the cyclic radicals mentioned above are also representative.

Other examples of oximes which can be used are:

| Structure | Name |
|---|---|
| Cyclopentanone =N—OH | Cyclopentanone oxime |
| Cyclohexanone =N—OH | Cyclohexanone-oxime |
| CH₃-cyclopentane =N—OH | 2-Methyl-1-cyclopentanone oxime |
| CH₃-cyclohexane =N—OH | 2-Methyl-1-cyclohexanone oxime |
| $(C_6H_5)_2C=N-OH$ | Benzophenone oxime |
| HO—N= cyclohexadiene with CH₃ and COOH | 4-(Hydroxyimino-1-methyl-2,5-cyclohexadiene-1-carboxylic acid |
| cyclopentane =N—CH with C₂H₅ | 2-Ethyl-1-cyclopentanone oxime |
| $C_6H_5-C-C-C_6H_5$ with HO—N N—OH | Benzil dioxime |
| $C_6H_5-CH=CH-CH=N-OH$ | Cinnamaldehyde oxime |
| $CH_3-CH=N-OH$ | Acetaldehyde oxime |
| $(CH_3)_2C=N-OH$ | Acetone oxime |
| $C_6H_5-CH=N-OH$ | Benzaldehyde oxime |
| CH₃—CH₂ \ C=N—OH / CH₃ | Methyl ethyl ketone oxime |
| $CH_3-(CH_2)_3-C-CH_3$ with N—OH | 2-Hexanone oxime |
| C₂H₅ \ C=N—OH / C₂H₅ | Diethyl ketone oxime |
| $C_3H_7-CH=N-OH$ | 1-Butyraldehyde oxime |
| $CH_2=CH-CH_2-C-CH_3$ with N—OH | 4-Penten-2-one oxime |

Typically, the oxime has a molecular weight of less than 800 and is formed from atoms selected from C, H, N, O and F.

The alpha,omega-dihydroxydiorganopolysiloxane polymers of formula (2) having a viscosity of 700 to 1,000,000 mPa.s at 25° C., preferably 1,000 to 700,000 mPa.s at 25° C., are linear polymers consisting essentially of diorganosiloxy recurring units of the aforementioned formula R₂SiO, and blocked by a hydroxyl group at each end of their polymer chain; however, the presence of monoorganosiloxy recurring units of the formula $RSiO_{1.5}$ and/or of siloxy recurring units of the formula $SiO_2$ is not excluded, but in a proportion not exceeding 2% based on the number of diorganosiloxy recurring units.

The hydrocarbon radicals containing from 1 to 10 C atoms, substituted or unsubstituted by halogen atoms or cyano groups, represented by the symbols R, include:

(i) alkyl and haloalkyl radicals containing from 1 to 10 carbon atoms, such as methyl, ethyl, propyl, isopropyl butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(ii) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals containing from 2 to 4 carbon atoms, such as vinyl, allyl and 2-butenyl radicals;

(iv) monocyclic aryl and haloaryl radicals containing from 6 to 10 carbon atoms, such as phenyl, tolyl, xylyl, chlorophenyl, dichlorophenyl and trichlorophenyl radicals; and (v) cyanoalkyl radicals in which the alkyl moieties contain from 2 to 3 carbon atoms, such as β-cyanoethyl and γ-cyanopropyl radicals.

Methyl, phenyl, vinyl and 3,3,3-trifluoropropyl radicals are the preferred.

As specific examples of recurring units of the formula R₂SiO, representative are those of the following formulae:

$(CH_3)_2SiO$
$CH(CH_2=CH)SiO$
$CH_3(C_6H_5)SiO$
$(C_6H_5)_2SiO$
$CF_3CH_2CH_2(CH_3)SiO$
$NC-CH_2CH_2(CH_3)SiO$
$NC-CH(CH_3)CH_2(CH_2=CH)SiO$
$NC-CH_2CH_2CH_2(C_6H_5)SiO$

It will be appreciated that a mixture of alpha,omega-dihydroxydiorganopolysiloxane polymers which differ from each other in molecular weight and/or in the nature of the groups bonded to the silicon atoms may also be used as the polymer of formula (2).

These alpha,omega-dihydroxydiorganopolysiloxane polymers are readily commercially available. In addition, they may easily be prepared using methods which are now well known to this art.

In the polyalkoxysilane of formula (3), the radicals R², which may be identical or different, are each alkoxy radicals of the formulae TO or TOZO, in which T is a straight or branched chain $C_1$-$C_4$ alkyl radical and Z is a $C_2$-$C_4$ alkylene radical. R¹ may have the same definition as R in the recurring units R₂SiO and thus the illustrations given above in the case of R are also applicable to R¹. Specific examples of the symbol T are methyl, ethyl, propyl and butyl radicals.

Specific examples of the radicals Z are:
$-(CH_2)_2-$, $-CH(CH_3)CH_2-$, $-CH(CH_3))CH_2CH_2-$, $-CH(CH_3)CH(CH_3)-$.

As specific examples of the polyalkoxysilanes having the formula (3), those of the following formulae are representative:

$Si(OCH_3)_4$
$Si(OCH_2CH_3)_4$
$Si(OCH_2CH_2CH_3)_4$
$CH_3Si(OCH_3)_3$
$CH_3Si(OCH_2CH_2OCH_3)_3$
$Si(OCH_2CH_2OCH_3)_4$
$CH_2=CHSi(OCH_2CH_2OCH_3)_3$
$C_6H_5Si(OCH_3)_3$
$C_6H_5Si(OCH_2CH_2OCH_3)_3$
$Si(OCH_3)_2[OCH(CH_3)CH_2OCH_3]_2$
$CH_2=CHSi(OCH_3)_3$
$CH_2=CH-CH_2Si(OCH_3)_3$
$CH_2=C(CH_3)CH_2Si(OCH_3)_3$
$CH_2=CH-Si(OCH_3)_2[OCH(CH_3)CH_2OCH_3]$

Typically, from 0.1 to 20 parts by weight of polyalkoxysilane of the formula (3) are used per 100 parts by weight of the polymer of the formula (2).

The process according to the invention provides rapid and complete functionalization of the oils. The oxime catalyst cannot be removed from the PFs after functionalization. Surprisingly and unexpectedly, it has even been found that in this case the CVE compositions prepared from such PFs, additionally containing condensation catalyst which is a metal, generally tin compound, a filler and optionally other customary additives, have a storage stability which is quite remarkable. Furthermore, the residual oxime exhibits no detrimental effect on the condensation reactions of the PFs when exposed to atmospheric moisture.

Exemplary "effective amounts" of the catalyst of the formula (4) are, for example, from 0.05 to 10, preferably from 0.2 to 5, moles of oxime per mole of silanol.

The functionalization reaction may be carried out at a temperature of from 20° to 200° C., preferably from 40° to 120° C.

The reaction time becomes shorter the higher the temperature. It typically ranges from 1 to 4 hours at 80° C. and may range from 6 to 15 hours at ambient temperature. The reaction is carried out in the absence of moisture or under substantially anhydrous conditions. The reaction may be carried out, for example, in a dry closed reactor which has been evacuated in order to expel air therefrom, with the air being replaced by a dry gas, such as nitrogen.

Upon completion of the functionalization reaction, volatile products such as the unreacted polyalkoxysilane, the alcohol formed and the oxime may be purged from the PF, if desired, for example, by heating under reduced pressure, although, as indicated above, this procedure is not necessary if the product PF is used to produce a single-component CVE composition.

The fact that it is possible for the oxime to remain in the PF is a very great advantage, especially in the case where a nonvolatile oxime is employed. This also makes it possible to avoid the stage of devolatilization of the PFs by heating under reduced pressure.

The present invention also features a process for the formulation of a CVE composition which is stable in storage in the absence of moisture, but which crosslinks in the presence of atmospheric moisture, by intimately admixing:

(i) 100 parts of a PF of the formula (1) prepared by the subject condensation process;

(ii) an effective amount of a condensation catalyst;

(iii) from 0 to 250 parts of inorganic filler material; and (iv) from 0 to 20 parts, preferably 1 to 10 parts, of a polyalkoxysilane of the formula (3) above.

Exemplary effective amounts of condensation catalyst range from 0.001 to 1 part by weight of at least one compound of a metal, typically a compound of tin, titanium or zirconium, and mixtures thereof.

The tin monocarboxylates and dicarboxylates such as tin 2-ethyl hexanoate, dibutyltin dilaurate and dibutyltin diacetate (see Noll's text, *Chemistry And Technology of Silicones,* 2nd Edition, page 337, Academic Press (1968)).

Hexacoordinated chelates of tin of valency (IV), such as those described in European Patent Application No. EP-A-147,323 and U.S. Pat. No. 4,517,337, are particularly suitable.

Also preferred are the condensation catalysts which are a mixture of a diorganotin bis($\beta$-diketonate) with an organic derivative of tin, also of valency (IV), but devoid of any $\beta$-diketonato group, and comprising at least one tin atom, each tin atom bearing two organic radicals bonded via an Sn—C bond, the remaining two valencies being satisfied by radicals selected from among organic or inorganic radicals linked by an SnO or Sns bond, by halogen atoms, by hydroxyl groups and by oxygen atoms.

These organic derivatives of tin of valency (IV) which are devoid of any $\beta$-diketonato group may be, in particular, tin salts corresponding to the formulae:

$$A_2SNR^6_2 \quad R^6_2SnO \quad AR^6_2SnOSnR^6_2A$$

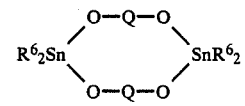

in which:
$R^6$ is a halogenated or nonhalogenated $C_1$–$C_{20}$ hydrocarbon radical,
A is a halogen atom or an organic or inorganic radical linked to the tin atom by an Sn—O or Sn—S bond,
Q is a $C_2$–$C_{10}$ alkylene radical; A may be selected, for example, from among:
(i) monocarboxylate radicals of the formula $R^7COO$, $R^7$ being a halogenated or nonhalogenated $C_1$–$C_{20}$ hydrocarbon radical, and
(ii) dicarboxylate radicals of the formula

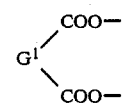

which are bonded to the same tin atom or to two tin atoms, resulting in the two formulae:

$$\begin{array}{c}\text{COO}\\ G^1 \diagup \diagdown \text{SnR}^6{}_2\\ \diagdown \diagup \\ \text{COO}\end{array} \qquad \begin{array}{c}R^7\text{COO}\\ \diagdown \\ \diagup \text{SnR}^6{}_2\\ \text{COO}\\ |\\ G^1\\ |\\ \text{COO}-\text{SnR}^6{}_2\\ |\\ R^7\text{COO}\end{array}$$

in which $G^1$ is a divalent $C_1$-$C_{15}$ hydrocarbon radical and $R^7$ is as defined under (i), and (iii) dicarboxylate radicals of the formula $R^7OCOG^1$-COO, in which $R^7$ and $G^1$ are as defined under (i) and (ii), respectively.

The above tin salts are well known to this art and are described, in particular, in the above text by Noll, and in U.S. Pat. Nos. 3,186,963 and 3,862,919, Belgian Pat. No. 842,305 and British Pat. No. 1,289,900.

The inorganic fillers are used in a proportion of 0 to 250 parts, preferably 5 to 200 parts, per 100 parts of the PF of formula (1).

These fillers may be introduced in the form of very finely divided materials whose mean particle diameter is less than 0.1 micrometer. These fillers include pyrogenic silicas and precipitated silicas; their BET specific surface area is generally greater than 40 m²/g.

These fillers may also be in the form of more coarsely divided materials having a mean particle diameter greater than 0.1 micrometer. As examples of such fillers, representative are ground quartz, diatomaceous silicas, calcium carbonate, calcined clay, rutile titanium dioxide, iron, zinc, chromium, zirconium and magnesium oxides, the various forms of alumina (hydrated or otherwise), boron nitride, lithopone, barium metaborate, barium sulfate and ballotini; their specific surface area is generally less than 30 m²g.

These fillers may have been surface-modified by treatment with the various organosilicon compounds typically employed for such purpose. Thus, these organosilicon compounds may be organochlorosilanes, diorganocyclopolysiloxanes, hexaorganodisiloxanes, hexaorganodisilazanes or diorganocyclopolysiloxanes (French Pat. Nos. 1,126,884, 1,136,885 and 1,236,505; British Pat. No. 1,024,234). In the majority of cases, the treated fillers contain from 3 to 30% of their weight of such organosilicon compounds.

The fillers may be a mixture of several types of fillers of different particle size distribution; thus, for example, they may include 30 to 70% of finely divided silicas having a BET specific surface area greater than 40 m²/g and 70 to 30% of more coarsely divided silicas having a specific surface area of less than 30 m²/g.

In order to notably improve the adhesion of the CVEs, the compositions according to the invention may optionally contain from 0 to 20 parts, preferably from 1 to 15 parts, of at least one additive selected from among the aminoorganosilanes, aminoorganopolysiloxanes and guanidinoorganosilanes, each bearing, simultaneously per molecule:

(i) at least one $C_3$-$C_{15}$ organic radical linked to the silicon atom by an SiC bond and substituted by at least one amino radical or one guanidino radical, and (ii) at least one $C_1$-$C_5$ alkoxy radical or a $C_3$-$C_6$ alkoxyalkyleneoxy radical.

These additives and use thereof are described, in particular, in U.S. Pat. Nos. 2,754,311, 2,832,754, 2,930,809, 2,971,864, 3,341,563, 3,686,375 and 4,180,642.

Exemplary of such additives, representative are the silanes of the formulae:
$H_2N(CH_2)_3Si(OC_2H_5)_3$
$H_2N(CH_2)_3Si(OCH_3)_3$
$H_2N(CH_2)_2NH(CH_2)_3Si(OCH_3)_3$ Particularly suitable adhesion promoters are the silanes of the formula:

$$Y_3Si-(CH)_s-N\underset{Y'}{\overset{}{\diagup\diagdown}}O \qquad (5)$$

in which the radicals Y, which are identical or different, are each an alkyl or alkoxy radical containing from 1 to 4 carbon atoms, inclusive, at least two of the radicals Y being alkoxy radicals, each Y', which may be identical or different, is a hydrogen atom or an alkyl radical containing from 1 to 3 carbon atoms, inclusively, and s is an integer of from 3 to 10, inclusive.

As the silane of the formula (5), representative are:

$$(CH_3O)_3Si(CH_2)_3-N\diagup\diagdown O$$

gamma-morpholinopropyltrimethoxysilane, and $$(CH_3CH_2O)_3Si(CH_2)_3-N\diagup\diagdown O$$

gamma-morpholinopropyltriethoxysilane.

These compounds and the process for their preparation are described by John L. Speir, *J. Org. Chem.*, 36, No. 21, page 3120, (1971).

In order to further illustrate the present invention and the advantages thereof, the following specific examples are given, it being understood that same are intended only as illustrative and in nowise limitative.

EXAMPLE 1

The following materials were introduced into a three-bladed mixer under substantially anhydrous conditions and under nitrogen blanketing:

(a) a polydimethylsiloxane alpha,omega-diol oil of the average formula:

$$HO\!-\!\!\left(\!\!\underset{\underset{CH_3}{|}}{\overset{\overset{CH_3}{|}}{Si}}\!-\!O\right)_{\!9}\!\!H$$

in such amount that it constituted one mole of silanol groups:

(b) 3 moles of methyl silicate ($Si(OCH_3)_4$); and (c) 0.25 mole of methyl ethyl ketone oxime.

The reaction temperature was 80° C. and the reaction time was 1 hour.

An oil of the average formula:

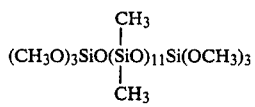

was produced.

The structure was confirmed by $^{29}$Si NMR and evidenced a slight homocondensation of the original oil.

COMPARATIVE EXAMPLE 1a

The procedure of Example 1 was repeated, except that the oxime was replaced by the same molar quantity of piperidine.

EXAMPLE 2

Test of the stability of the functionalized PF oils in the presence of large amounts of oxime or amine functionalization catalyst:

This test consisted of heating the functionalized oils in the presence of the catalyst for 5 days at 50° C. and in determining, by means of $^{29}$Si NMR analysis, the molar concentration of the various siloxy recurring units in the oil at the end of the test in comparison with a catalyst-free functionalized oil control.

The molar ratio of the functionalized oil to the catalyst was 9. The results are reported in Table I below, from which it can be seen that the PF in the presence of oxime exhibited a remarkable ageing resistance.

TABLE I

| PF Oil | A | B | C | D |
|---|---|---|---|---|
| Control | 0.5 | 16 | 1.5 | 82 |
| Example 1 | 1 | 15.1 | 2.4 | 81.8 |
| Example 1a | 2.8 | 11.5 | 3.9 | 81.5 |

A: Si(OMe)$_4$
B: —O—Si(OMe)$_3$
C: —O—Si(Me)$_2$(OMe)
D: —O—Si(Me)$_2$

EXAMPLE 3

Test of the stability of the functionalized PF oils produced by the process of Examples 1 or 1a, in the presence of functionalization catalyst and of tin condensation catalyst:

This test consisted of heating for 2 days at 50° C. the functionalized oils, containing various amounts of functionalization catalyst and fixed amounts of condensation catalyst, dibutyltin dilaurate in this case, expressed as the molar ratio of PF relative to the catalyst (R) or to the condensation catalyst (R').

The results are reported in Table II below, where the molar percentages of siloxy recurring units, determined by $^{29}$Si NMR, are given.

TABLE II

| Catalyst | R | R' | A | B | E | F | G |
|---|---|---|---|---|---|---|---|
| Oxime | 22.5 | 26 | 2 | 15 | 2.5 | — | 1 |
| Oxime | 9 | 26 | 1 | 12 | 4.5 | 1.7 | 5 |
| Oxime | 4.5 | 26 | — | 11 | 5 | 2.5 | 5.5 |
| Piperidine | 20 | 26 | 2 | 12.8 | 4.5 | 0.5 | 7 |
| Piperidine | 10 | 26 | — | 7 | 5.5 | 8.5 | 17 |
| Piperidine | 7.5 | 26 | — | 6.4 | 7.5 | 7.5 | 20 |
| None | — | — | 1 | 15 | 1.5 | — | — |

A: Si(OMe)$_4$
B: —O—Si(OMe)$_3$
E: —O—Si(OMe)$_2$
       |
       O
       |
F: —O—SiOMe
       |
       O
       |
       Me
G: —O—Si—OR    (R = H, Me)
       |
       Me

From Table II it can be seen that, in the presence of tin and oxime, the PFs were particularly heat-stable.

EXAMPLES 4 TO 6

Functionalization of viscous dimethylpolysiloxane alpha,omega-diol oils:

The procedure of Example 1 was repeated, using starting oils having a viscosity of 20,000 mPa.s at 25° C., having a number average molecular weight Mn of 50,000, a weight average molecular weight of 90,000 and a hydroxyl content of 750 ppm; various polyalkoxysilanes, reaction times and reaction temperatures were employed. The operating conditions are reported in Table III below.

In the three cases, the dimethylpolysiloxane alpha,omega-diol oil was functionalized at the end of the time shown.

TABLE III

| Example | Polyalkoxysilane | Reaction time in h. | Reaction temperature °C. | Oxime R | R' | Polyalkoxysilane S | S' |
|---|---|---|---|---|---|---|---|
| 4 | Si(OMe)$_4$ | 3 | 80 | 1.3 | 0.5 | 10.5 | 7 |
| 5 | Si(OMe)$_4$ | 2 | 80 | 1.8 | 0.7 | 10.5 | 7 |
| 6 | Si(OCH$_2$CH$_2$OCH$_3$)$_4$ | 3 | 80 | 1.3 | 0.5 | 5.75 | 9 |

R: molar ratio of the oxime to SiOH,
R': weight percentage of oxime based on the weight of initial oil,
S: molar ratio of polyalkoxysilane to SiOH,
S': weight percentage of polyalkoxysilane based on the weight of initial oil.

EXAMPLES 7 AND 8

The procedure of Example 4 was repeated, except that the initial oil had a viscosity of 175,000 mPa.s at 25° C., an Mn of 80,000, an Mw of 150,000 and a hydroxyl content of 375 ppm.

The operating conditions are reported in Table IV below.

In both cases, the initial oil was functionalized at the end of the time shown.

TABLE IV

| Example | Polyalkoxysilane | Reaction time in h. | Reaction temperature °C. | Oxime R | R' | Polyalkoxysilane S | S' |
|---|---|---|---|---|---|---|---|
| 7 | Si(OMe)$_4$ | 2 | 80 | 2.6 | 0.5 | 21 | 7 |

TABLE IV-continued

| Example | Polyalkoxysilane | Reaction time in h. | Reaction temperature °C. | Oxime R | Oxime R' | Polyalkoxysilane S | Polyalkoxysilane S' |
|---|---|---|---|---|---|---|---|
| 8 | Si(OCH$_2$CH$_2$OCH$_3$)$_4$ | 2 | 80 | 2.6 | 0.5 | 11.5 | 9 |

EXAMPLES 9 TO 12

Preparation of a single-component CVE composition:

To prepare this composition, the reaction mixture M obtained in Examples 7 or 8, devolatilized if appropriate, was introduced under anhydrous conditions into a blender, while the fillers C and a plasticizer P were incorporated over a period of two hours at a temperature of 80° C.

The plasticizer P was a dimethylpolysiloxane oil blocked by a trimethylsilyl unit at both ends of the polymer, having a viscosity of 50 mPa.s at 25° C.

The fillers C were a pyrogenic silica C$_1$ having a specific surface area of 150 m$^2$/g and, if appropriate, calcium carbonate C$_2$ having a mean particle diameter of 5 microns.

The dough produced was permitted to cool and the condensation catalyst A, which was dibutyltin bisacetylacetonate A$_1$ or dibutyltin dilaurate A$_2$, and an adhesion agent D, which was gamma-morpholinopropylytrimethoxysilane, were added.

The mixture was blended for 5 minutes at 60° C. in the absence of moisture.

The compositions produced were divided into three batches: the first batch was stored at room temperature; the second batch was subjected to accelerated ageing for 2 days at 100° C.; and the third batch was subjected to accelerated ageing for three days at 100° C. in the absence of moisture.

The above physical properties were determined on these three batches in the following manner:

A proportion of the compositions was spread out in the open air (temperature 20° C., 50% relative humidity) into a layer 2 mm in thickness onto a polyethylene plaque previously coated with a commercial detergent. The setting time was assessed by noting the time in minutes at which the layer become nontacky to the touch.

The Shore A hardness was measured in accordance with the standad NF-T-51 109 on the 2- or 7-day old film, and the tensile strength TS in MPa according to standard NF-T-46 002 and the elongation at break FB in % according to standard NF-T-46 002 were measured on the 7-day old film.

The results are reported in Table VI below.

From Table VI it can be seen that the tin chelate imparted to the CVE compositions a storage stability which was better when compared with dibutyltin dilaurate.

Furthermore, the devolatilization stage had practically no effect on the mechanical properties and storage stability of the CVE compositions.

TABLE VI

| COMPOSITIONS | EXAMPLE 9 | | | EXAMPLE 10 | | | EXAMPLE 11 | | | EXAMPLE 12 | | |
|---|---|---|---|---|---|---|---|---|---|---|---|---|
| | 20° C. | 2 days 100° C. | 3 days 100° C. | 20° C. | 2 days 100° C. | 3 days 100° C. | 20° C. | 2 days 100° C. | 3 days 100° C. | 20° C. | 2 days 100° C. | 3 days 100° C. |
| Setting time (min) | 20 | 35 | 50 | 30 | 20 | 70 | 30 | 25 | 55 | 45 | 65 | 70 |
| Shore A hardness (2 days) | 22 | 4 | — | 22 | 19 | 13 | 13 | 13 | 14 | 24 | 18 | 13 |
| Shore A hardness (7 days) | 22 | 11 | 6 | 26 | 24 | 21 | 26 | 21 | 20 | 25 | 22 | 20 |
| TS (MPa) | 1.4 | 0.75 | 0.4 | 1.2 | 1.3 | 1.2 | 1.0 | 1.25 | 1.3 | 1.15 | 0.93 | 1.08 |
| EB % | 313 | 486 | 352 | 223 | 321 | 245 | 265 | 304 | 406 | 476 | 534 | 864 |

The various CVE compositions of Examples 9 to 12 are reported in Table V below, as parts by weight.

TABLE V

| Examples | 9 | 10 | 11 | 12 |
|---|---|---|---|---|
| OH oil | 100 | 100 | 100 | 100 |
| Methyl silicate | 7 | 7 | 7 | — |
| Methylglycol silicate | — | — | — | 9 |
| Oxime | 0.5 | 0.5 | 850 ppm devolatilization | 0.5 |
| P | — | — | — | 22.3 |
| C$_1$ | 9 | 9 | 9 | 8.4 |
| C$_2$ | — | — | — | 60.5 |
| A$_1$ | — | 0.05 | 0.05 | 0.05 |
| A$_2$ | 0.07 | — | — | — |
| D | 3 | 3 | 3 | 3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a diorganopolysiloxane having polyalkoxy end groups of the formula:

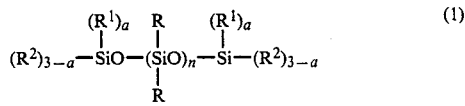

comprising reacting at least one diorganopolysiloxane of the formula:

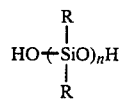

(2)

with at least one polyalkoxysilane of the formula:

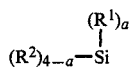

(3)

in the presence of a catalytically effective amount of at least one organic oxime devoid of silicon, in which formulae the radicals R, which may be identical or different, are each monovalent hydrocarbon radicals containing from 1 to 10 carbon atoms, substituted such radicals bearing at least one halogen atom or cyano group substituent, $R^1$ is a monovalent $C_1$-$C_{10}$ hydrocarbon radical, $R^2$ is an alkoxy or polyalkoxy radical of the formulae TO or TOZO, in which T is a $C_1$-$C_4$ alkyl radical, Z is a straight or branched chain $C_2$-$C_4$ alkylene radical, a is 0 or 1, and n is an integer such that the polymers (1) and (2) have a viscosity of 700 to 1,000,000 mPa.s at 25° C.

2. The process as defined by claim 1, said organic oxime having the formula:

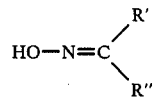

(4)

in which R' is a monovalent $C_1$-$C_{15}$ hydrocarbon radical, and R" is a hydrogen atom or a monovalent $C_1$-$C_{15}$ hydrocarbon radical, with the proviso that R' and R" may together form, with the carbon atom from which they depend, a divalent carbocyclic alkylene radical containing from 3 to 6 ring carbon atoms.

3. The process as defined by claim 2, wherein from 0.05 to 10 moles of organic oxime are present per mole of silanol, and from 0.1 to 20 parts by weight of the polyalkoxysilane of formula (3) are reacted per 100 parts by weight of the diorganopolysiloxane of formula (2).

4. The process as defined by claim 2, wherein the formulae (1) and (2) each radical R is a methyl, phenyl, vinyl or 3,3,3-trifluoropropyl radical.

5. The process as defined by claim 2, wherein the organic oxime comprises methyl ethyl ketone oxime.

6. The process as defined by claim 1, wherein the polyalkoxysilane of formula (3) comprises $Si(OCH_3)_4$, $Si(OCH_2CH_2CH_3)_4$ or $Si(OCH_2CH_2OCH_3)_4$.

7. The process as defined by claim 1, comprising heating the diorganopolysiloxane of formula (2) under reduced pressure to purge volatiles therefrom.

* * * * *